US011009265B2

(12) United States Patent
West et al.

(10) Patent No.: US 11,009,265 B2
(45) Date of Patent: May 18, 2021

(54) SELF-HEATING PACKAGE SYSTEMS (71) Applicant: HeatGenie, Inc., Austin, TX (US)

(72) Inventors: Jefferson Blake West, Austin, TX (US); Robert Eugene Secker, Austin, TX (US); Krzysztof Czeslaw Kwiatkowski, Austin, TX (US)

(73) Assignee: HeatGenie, Inc., Austin, TX (US)

( * ) Notice: Subject to any disclaimer, the term of this patent is extended or adjusted under 35 U.S.C. 154(b) by 0 days.

(21) Appl. No.: 16/592,410

(22) Filed: Oct. 3, 2019

(65) Prior Publication Data
US 2020/0109878 A1 Apr. 9, 2020

Related U.S. Application Data (60) Provisional application No. 62/740,812, filed on Oct. 3, 2018.

(51) Int. Cl.
*F24V 30/00* (2018.01)
*B65D 81/34* (2006.01)
*A47J 36/28* (2006.01)

(52) U.S. Cl.
CPC ............... *F24V 30/00* (2018.05); *A47J 36/28* (2013.01); *B65D 81/3484* (2013.01)

(58) Field of Classification Search
CPC ....... F24V 30/00; A47J 36/28; B65D 81/3484
USPC .................................................. 126/263.01
See application file for complete search history.

(56) References Cited

U.S. PATENT DOCUMENTS

| 5,331,817 | A | 7/1994 | Anthony |
| 6,351,953 | B1 | 3/2002 | Scudder et al. |
| 10,058,209 | B2 | 8/2018 | Coffey et al. |
| 2013/0327312 | A1 | 12/2013 | Coffey et al. |
| 2018/0213828 | A1* | 8/2018 | Godfroid ................ A23L 7/161 |

FOREIGN PATENT DOCUMENTS

KR 20-1995-000057 Y1 2/1995

OTHER PUBLICATIONS

International Search Report and Written Opinion dated Jan. 22, 2020, in corresponding international application No. PCT/US/2019/054556.

* cited by examiner

*Primary Examiner* — Kenneth J Hansen
*Assistant Examiner* — John E Bargero
(74) *Attorney, Agent, or Firm* — DuBois, Bryant & Campbell, LLP; William D. Wiese (57) ABSTRACT

A unibody heater module is disclosed having an end cap and a base, wherein the base of the heater canister is filled with a solid-state reaction mixture. Twist-to-activate heater starting functionality is embedded directly into the unibody heater module. A reactive starting pellet is embedded into the upper surface of the compacted solid-state reaction mix. The plunger head of a firing pin passing through the center of an internal metal spacer is held a small distance away from the upper surface of the starting pellet. When the user activated CUI is rotated, the base of a cam pushes on one end of a firing pin protruding through a small hole in the end cap of the unibody heater module. The opposite end of the plunger plunges into the starter pellet so as to initiate heater activation in response to operation of the CUI by the user.

25 Claims, 11 Drawing Sheets

SELF-HEATING PACKAGE SYSTEMS

PRIORITY STATEMENT UNDER 35 U.S.C. § 119 & 37 C.F.R. § 1.78

This non-provisional application claims priority based upon prior U.S. Provisional Patent Application Ser. No. 62/740,812 filed Oct. 3, 2018 in the name of Krzysztof C. Kwiatkowski, Jefferson Blake West, and Robert Eugene Secker entitled "IMPROVED SELF-HEATING PACKAGE SYSTEMS," the disclosures of which are incorporated herein in their entirety by reference as if fully set forth herein.

BACKGROUND OF THE INVENTIONS

Modular Compact heating elements that assemble into containers to heat food and beverage contents are well known in the art and have been disclosed in various patents, including patents issued to one or more of the inventors named in the present application, including, for example, U.S. Pat. No. 8,864,924 titled "Solid-State Thermite Composition Based Heating Device;" U.S. Pat. No. 9,055,841 titled "Package Heating Apparatus;" U.S. Pat. No. 8,555,870 titled "Package Heating Device and Chemical Compositions for Use Therewith;" U.S. Pat. No. 9,500,389 titled "Thermally Regulated Self Heating Containers;" and U.S. Pat. No. 10,058,209 titled "High Efficiency Self-Heating Containers."

The heater elements described in the prior art efficiently store chemical energy in contained solid state chemical reactants and are simply activated by a user to promptly release thermal energy. The thermal energy is transmitted through the wall of an immediately adjacent container to uniformly heat the interior contents. Passive thermal safety mechanisms may be incorporated into the heaters to provide for additional consumer safety.

Various forms of heater module construction, and means of integrating the heaters into functional packaging have been described. For example, U.S. Pat. No. 10,058,209 "High Efficiency Self-Heating Containers," describes a comprehensive self-heating package solution suitable for heating standard two-piece beverage containers configured to be compatible with the multi-faceted needs of fillers, brands, and consumers.

There is a need, however, for a combined unibody heater module that into fitted into a heater housing tube, such that each of these components have mating alignment features that assure a specific preferred relative orientation. Modular components such as this would allow the self-heating functionality to be alternatively integrated into either the lid or the base of a self-heating beverage container package, with a suitable consumer user interface then applied.

SUMMARY OF THE INVENTION

Various embodiments of the present invention pertain to improved self-heating packaging systems using solid state heater and package component architectures that offer more flexible and robust implementations.

In one embodiment of the present invention, a single heater canister with an end cap encapsulates the functional materials and components of the solid state heater. The base of the heater canister is filled with a solid-state reaction mixture. Twist-to-activate heater starting functionality is embedded directly into the unibody heater module by joining an initiation sub-assembly onto the end cap of the unibody heater module.

A cylindrical outer sleeve of the initiation sub-assembly has a helically sloping grooved channel which engages a guide pin fixed to a rotatable cam positioned in the interior of the sleeve. A projecting barb feature of the cylindrical outer sleeve is set in a specific angular relation to the initial rest position of the rotatable cam, which by design will give a specific preferred alignment of the unibody heater module with a heater housing tube into which it is installed.

In some embodiments, a slotted feature on the initiation sub-assembly is designed for mating with a blade feature on a user activated CUI in a fully assembled self-heating package, so that when the CUI is rotated, the rotatable cam will rotate with it, thereby producing a controlled displacement of the rotatable cam in the direction of the end cap.

A reactive starting pellet is embedded into the upper surface of the compacted solid-state reaction mix and a starting fluid-filled blister is positioned above this starting pellet. In a pre-actuation rest position, the plunger head of a firing pin passing through the center of an internal metal spacer is held a small distance away from the upper surface of the compressible fluid filled blister.

When the user activated CUI is rotated, the base of the cam pushes on one end of a firing pin protruding through a small hole in the end cap of the unibody heater module. The internally disposed opposite end of the plunger is positioned immediately adjacent to the compressible blister and starter pellet so as to initiate heater activation in response to operation of the CUI by the user.

The embodiments described herein combine unibody heater modules that are fitted into heater housing tubes, each of which have mating alignment features that assure specific preferred relative orientations. These modular components allow the self-heating functionality to be alternatively integrated into either the lid or the base of a self-heating beverage container package, with a suitable consumer user interface then applied. Moreover, it will be appreciated by those skilled in the art that incorporating the twist drive mechanism into the unibody heater module provides a robust interlock against accidental compressive activation of the heater during its manufacturing assembly, transportation, and handling operations, including high speed installation into filled self-heating packages.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. Accordingly, the specific embodiments discussed are merely illustrative of specific ways to make and use the invention, and do not limit the scope of the invention.

DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention is directed to robust, flexibly applied self-heating packaging systems. The configuration and use of the presently preferred embodiments are discussed in detail below. It should be appreciated, however, that the present invention provides many applicable inventive concepts that can be embodied in a wide variety of contexts other than devices for heating food and beverages. Accordingly, the specific embodiments discussed are merely illustrative of specific ways to make and use the invention, and do not limit the scope of the invention.

In addition, the following terms shall have the associated meaning when used herein:

"unibody heater module" means a singular, generally cylindrical structural unit that incorporates: a fully integrated solid-state heater device, an embedded twist-to-start drive mechanism, and a single alignment feature to uniquely and properly orient itself within a heater housing tube;

"heater housing tube" means a deep drawn tubular structure with a closed bottom end and an open top end to accommodate insertion of a unibody heater module;

"consumer user interface" or "CUI" means the externally accessible structures and devices whereby a user may operate or engage with the self-heating package;

"container" means and includes any receptacle in which material may be held or carried, including without limitation a can, carton, bowl, jar or other receptacle; and "heater" means and includes any device in which reactants react to generate heat.

As will be apparent to those skilled in the art, many of the self-heating packaging components are depicted herein without each and every element required for full functionality, such as, for example, devices shown without detailing features for mechanical engagement. In each case the depiction is intended to show the functional aspects of the heater for a better understanding of the invention and should not necessarily be construed as including all of the elements of a fully operational device.

It should be noted that in the description and drawings, like or substantially similar elements may be labeled with the same reference numerals. However, sometimes these elements may be labeled with differing numbers, such as, for example, in cases where such labeling facilitates a clearer description. Additionally, the drawings set forth herein are not necessarily drawn to scale, and in some instances proportions may have been exaggerated to more clearly depict certain features. Such labeling and drawing practices do not necessarily implicate an underlying substantive purpose. The present specification is intended to be taken as a whole and interpreted in accordance with the principles of the present invention as taught herein and understood to one of ordinary skill in the art.

Figure 1:
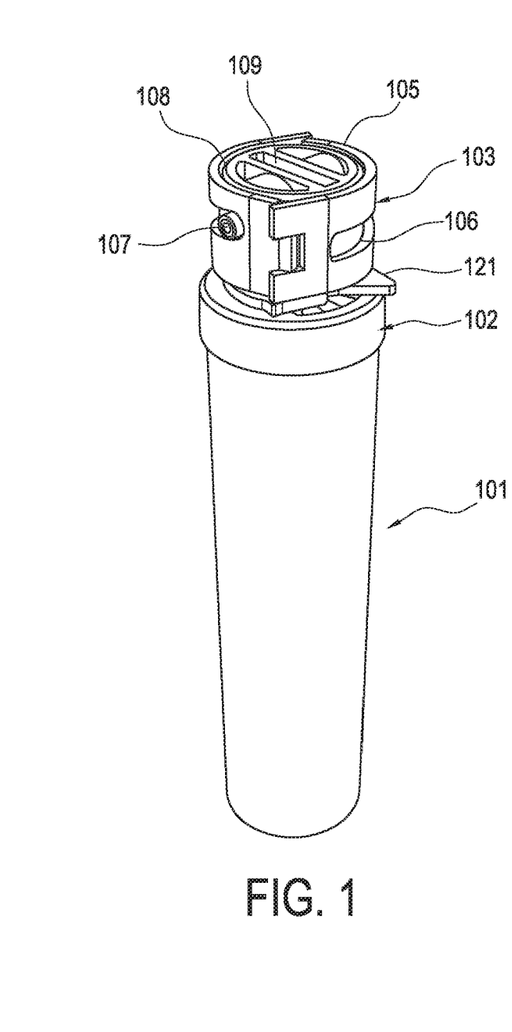
FIG. 1 is a perspective view of a one embodiment of the complete unibody heater module of the present invention.
Figure 2:
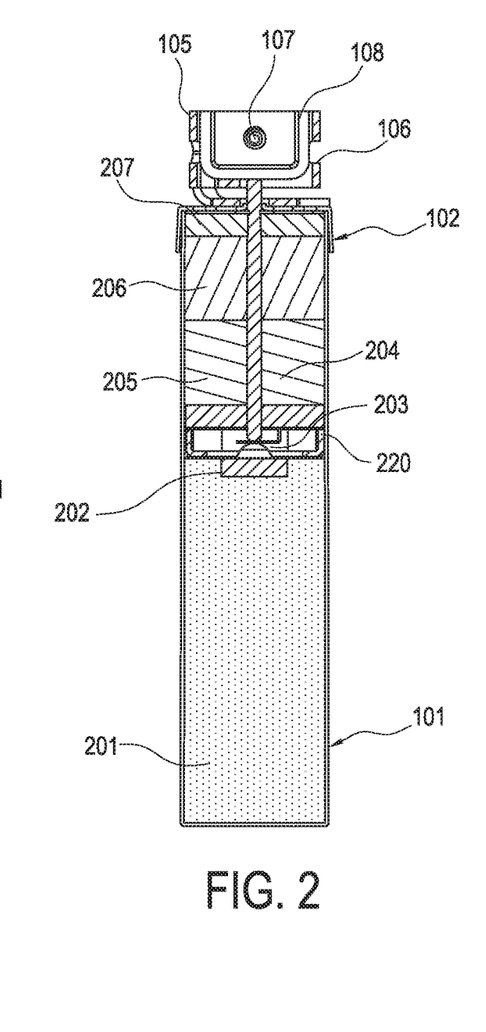
FIG. 2 is a cross-sectional view of the unibody heater module shown in FIG. 1.

Referring now to FIG. 1 and FIG. 2 which show, respectively, assembled and cross-sectional views of one embodiment of a unibody heater module of the present invention. A single heater canister 101 with an end cap 102 encapsulates the functional materials and components of the solid state heater.

FIG. 2 shows a cross-sectional view of a heater canister 101, the base of which is filled with a solid-state reaction mixture 201. Various solid-state reaction chemistries may be used to provide a compact, lightweight, powerful heat source. The energy content and the heating rate are configurable via adjustments to the mass or composition of the internal fuel mix for use with different portion types or sizes. Although other formulations could be used, an example heat-generating formulation is a mixture containing 15-25% aluminum, with particle size of 2-30 microns, 20-30% silicon dioxide, 25-45% alumina, and additives and reaction aids such as potassium chlorate, calcium fluoride, and barium peroxide.

To initiate the thermal reaction inside the heater, the reaction mixture 201 may be ignited near its upper surface by various means known in the art such as, for example, expelling a reactive "starting fluid" from a blister onto a reactive starting pellet in response to a force applied by the user via some form of CUI.

In the embodiment of the unibody heater module shown in FIG. 1 and FIG. 2, compressive forces applied to the ends of the module do not activate the solid-state reaction mixture 201. Rather twist-to-activate heater starting functionality is embedded directly into the unibody heater module by joining an initiation sub-assembly 103 onto the end cap 102 of the unibody heater module 100. Incorporating the twist drive mechanism into the unibody heater module 100 provides a robust interlock against accidental compressive activation of the heater during its manufacturing assembly, transportation, and handling operations, including high speed installation into filled self-heating packages.

Referring back to FIG. 1, the cylindrical outer sleeve 105 of the initiation sub-assembly 103 has a helically sloping grooved channel 106 which engages a guide pin 107 fixed to a rotatable cam 108 positioned in the interior of the sleeve 105. A projecting barb feature 121 of the cylindrical outer sleeve 105 is set in a specific angular relation to the initial rest position of the rotatable cam 108, which by design will give a specific preferred alignment of the unibody heater module 100 with a heater housing tube into which it is installed.

A slotted feature 109 on the initiation sub-assembly is designed for mating with a blade feature (for example 702 on FIG. 7) on a user activated CUI in a fully assembled self-heating package, so that when the CUI is rotated the rotatable cam 108 will rotate with it, thereby producing a controlled displacement of the rotatable cam 108 in the direction of the end cap 102.

Referring again to FIG. 2, a reactive starting pellet 202 is embedded into the upper surface of the compacted solid-state reaction mix 201 and a starting fluid-filled blister 203 is positioned above this starting pellet 202. In a pre-actuation rest position, the plunger head of a firing pin 204 passing through the center of an internal metal spacer 220 is held a small distance away from the upper surface of the compressible fluid filled blister 203.

Thus, when the user activated CUI is rotated the controlled displacement of the cam 108 in the direction of the heater cap the base of the cam pushes on one end of a firing pin 204 protruding through a small hole in the end cap 102 of the unibody heater module. The internally disposed opposite end of the plunger is positioned immediately adjacent to the compressible blister 203 and starter pellet 202 so as to initiate heater activation in response to operation of the CUI by the user.

For consumer safety, it is desirable to provide a responsive means of moderating the heating process to prevent overheating of the package assembly or the food or beverage products and protect users against burns. Methods of accomplishing passive thermal control previously described in U.S. Pat. No. 9,500,389 titled "Thermally Regulated Self-Heating Containers," may equivalently be applied to the heater assembly described herein, by arranging for a passive thermal control material to be adjacent to and in thermal contact with the unibody heater module reaction chamber.

Referring once again to the embodiment of FIG. 1, some portion of the interior volume 206 of the heater canister 101 can be filled with passive thermal control materials. In the event of internal overheating, dissipating steam generated from the passive thermal control material away from the heated package removes significant energy from the system to produce a cooling effect.

The unibody heater module construction provides for steam vapor or other interior gasses to be emitted gas streams. Referring back to FIG. 2, the end cap 102 and the internal metal spacer 220 contain channels or vents to allow safe and gentle release of excess pressure when passive thermal control is activated. Venting channels may also be present in the CUI. In addition to passive thermal control materials, the canister may contain a filtration layer 205 of insulating, odor absorbing materials, particle filtration layer(s), or thermal diluent materials.

For the unibody heater, gaseous byproducts from the reaction zone vent through the filtration layer 205 and passive thermal control layers 206. In order to prevent bypassing of reaction gasses around the plunger of the firing pin 204 the insulators, odor absorbents, and passive thermal control materials are tightly packed along its length. A finely slit impermeable polymer sheet 207 can be used in some embodiments for the outermost insulator in order to create a unidirectional watertight environmental seal while also allowing for venting of excessive internal pressure of the heater.

The mechanical configuration of embodiments shown in FIG. 1. and FIG. 2 provide precisely controlled displacement and compressive force and facilitate highly reliable activation of the internal compressible blister/starter pellet mechanism. The compressive force for activation is preferably transmitted through a series of stacked mechanical components in series beginning with the CUI at the package exterior. The slotted feature 109 coupling of the rotatable cam 108 to the CUI eliminates the need to consider dimensional tolerance variations or flexing of the plastic molded CUI, or the linear distance between the base of the heater tube relative to the seamed edge of the lid. The controlling stack up tolerances for reliable activation can thus be incorporated into a small number of controllably dimensioned metal parts located adjacent to the top end of the heater tube, thereby eliminating dependence on variations in the overall length of the heater tube.

In the embodiment shown in FIG. 2, an internal metal spacer 220 establishes a close datum for stack up tolerances, and the firing pin 204 consisting of a plunger fixed to a spring plate enable simple fine tuning of the stroke length and activation force.

Figure 3:
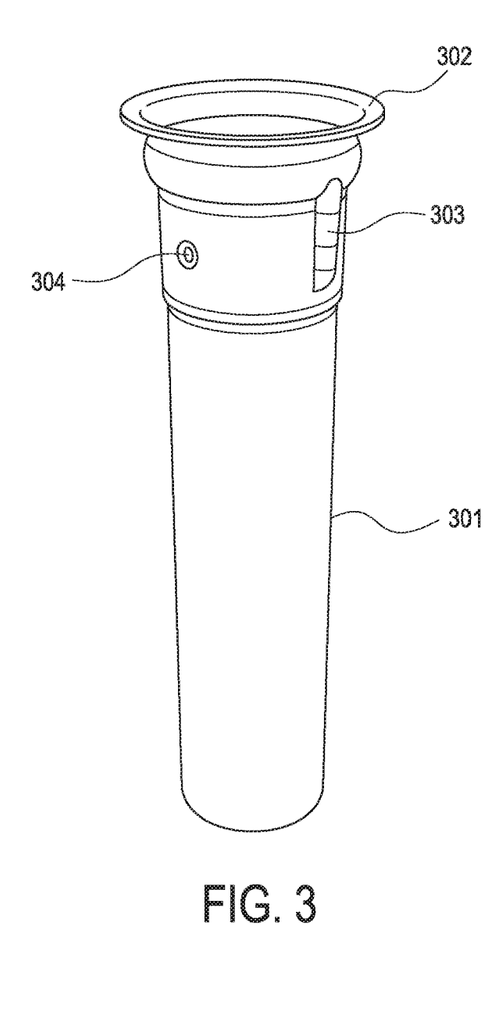
FIG. 3 is a perspective view showing one embodiment of a heater housing tube of the present invention.

FIG. 3 shows various features of one embodiment of a heater housing tube including a cylindrical tube wall region 301 that accommodates the heated length of the unibody heater module, a transition region 310 that accommodates its twist-drive mechanism section, and an end flange 302. The form of the end flange 302 may be altered to suit the particular method used to join the heater housing tubing to the base or lid of a beverage container.

Also shown in FIG. 3 are two formed functional features in the upper transition region 310 of the heater tube. A vertical groove 303 in the tube wall that accepts a mating alignment feature on a unibody heater module (e.g. projecting barb feature 121) enables the preferred angular orientation to be readily established when the two components are assembled together. One or more dimpled retention features 304 create an interference fit over the end cap 102 of the installed heater module to assure that it is not easily dislodged from the heater housing tube once it has been installed.

Figure 4A:
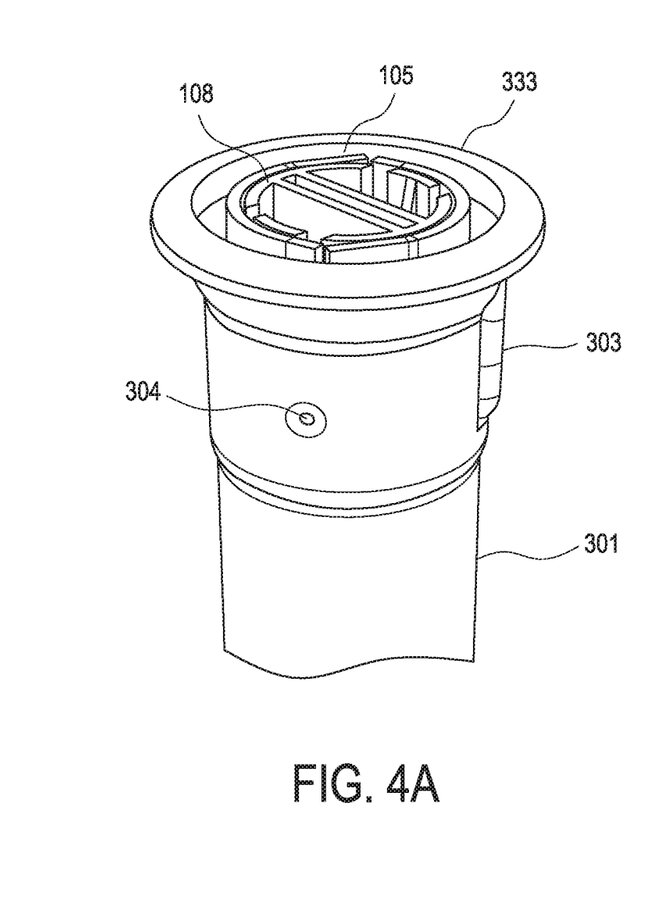
FIG. 4A is a partial perspective view of the exterior of one embodiment of a unibody heater module of the present invention inserted into a heater housing tube.
Figure 4B:
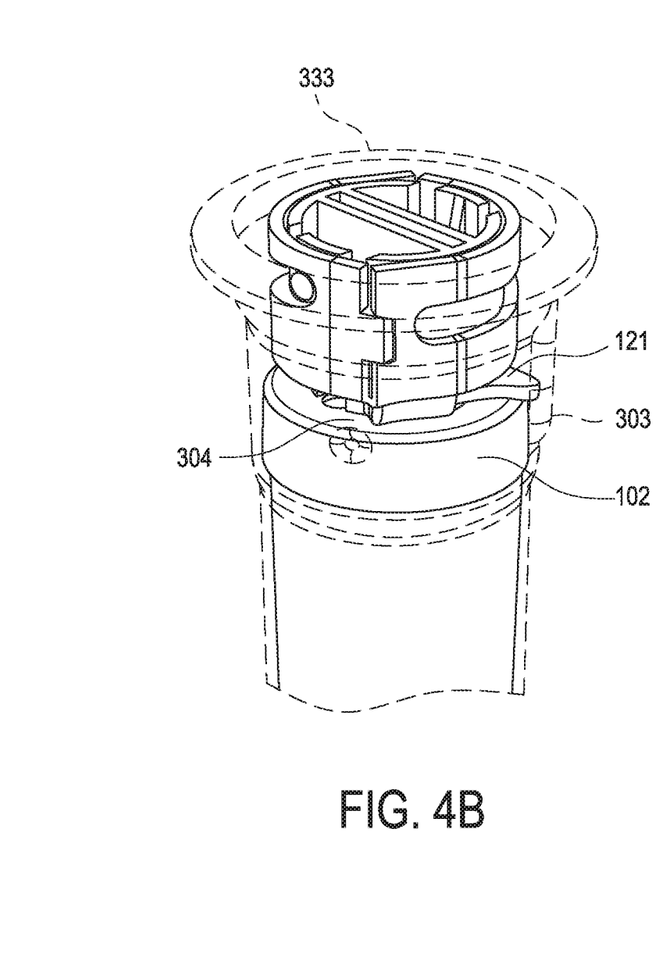
FIG. 4B is a partial perspective view of the exterior of one embodiment of a unibody heater module of the present invention in which the heater housing tube wall is rendered transparent.

FIG. 4A shows an exterior view of the FIG. 3 heater housing tube with a unibody heater module inserted therein. In FIG. 4B, the heater housing tube wall is rendered transparent showing the engagement of the projecting barb feature 121 and vertical groove 303 on each of the unibody heater module and housing tube, respectively, as well as how the dimpled retention feature 304 of the heater tube extends over the unibody heater module end cap 102 to prevent dislodgement of the installed heater.

The heater housing tube may optionally be coupled to either the lid or the base of a conventional two-piece or three-piece beverage container so that a given unibody heater module can optionally be mounted in either orientation according to beverage brand preferences.

Considering first the lid mounted option, incorporating the heater housing tube into a seamable lid is most readily achieved by modifying a commercially available "lined shell". A lined shell is a mass produced intermediate component produced during manufacture of standard beverage container end, its periphery incorporates the critical curl features and lining compound needed for hermetic seaming onto cans; its unfinished center is a planar circular deck.

Lined shells in accordance with beverage industry standards have a wall thickness of less than 0.25 mm and in order to withstand internal pressure are constructed of a stiffer 5000 series aluminum alloy. Whereas, for optimal performance the deep drawn heater housing tube of the present invention may require mechanical properties or thermal properties that are not readily available from standard beverage grade aluminum end stock.

For example, in order to provide uniform thermal distribution along its length, the wall thickness may be between 0.5-1.0 mm, and a more ductile 3000 series aluminum alloy may be preferred for forming the deep drawn tube structure.

Producing the heater housing tube and lined shell components separately is straightforward; they must then be joined via means suitable for producing a hermetically sealed joint that is compliant with stringent food and beverage safety standards. Typically joining a seamable end to a food or beverage container would be done using a conventional double seam roll. However, standard tooling for double seaming acts at the peripheral boundaries of the parts being joined and is not suitable for forming an interior sealed joint with the heater housing tube.

Aerosol container joints are an engineering solution used in commercial container products to join two cylindrical container components. Aerosol joints are suitable for joining metal sheets of differing thickness and provide excellent high pressure sealing. The aerosol crimping operation does not require rotation of the parts being joined. A typical application is crimping an aerosol spray valve onto a specially formed rolled rim around the open neck of a container but the design method is also applied in certain food and beverage applications.

Figure 5:
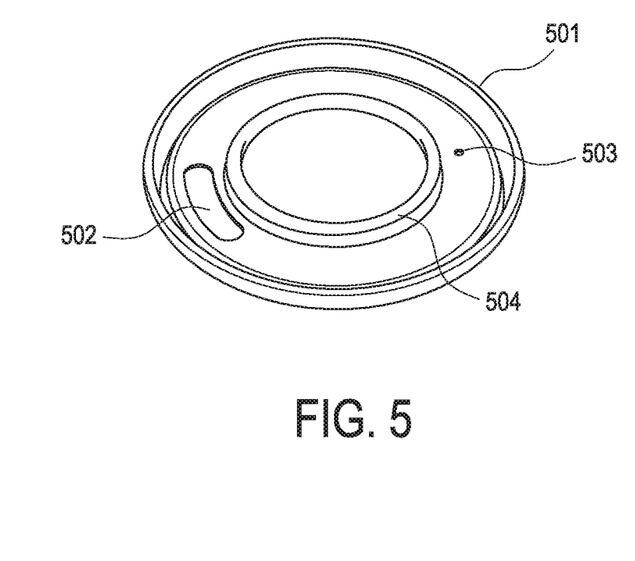
FIG. 5 is a perspective view of a seamable end shell of a breachable beverage container lid that is modified to be suitable for joining to the heater housing tube of FIG. 3.

FIG. 5 is a perspective view of a seamable end shell of a breachable beverage container lid that has been modified to be suitable for joining to the heater housing tube of FIG. 3. The seamable end has a formed edge curl 501 around its perimeter. The interior underside of the curl is lined with a sealant material, the form of the curl and the sealant designed to be mating surfaces for seaming onto the body hook feature around the open neck of an unseamed container body.

When applied as the lid of a two-piece can, the seamable end incorporating the heater housing tube must also incorporate some physical means of opening the container to access the heated beverage contents. A breachable sealed pour aperture 502 and vent opening 503 for air to aid in pouring of the beverage are present around the periphery of the modified lined shell in FIG. 5. Given the limited surface area of the lid available for these features between the seamable edge and the flanged wall of the heater housing tube, compactness and volume efficiency of the formed joint is an important favorable characteristic of aerosol joints.

The modified lined shell of FIG. 5 has a large circular opening in its center the peripheral boundary of which has been pre-formed into a rolled flange 504. The curled flange 333 of the FIG. 4 heater housing tube embodiment is also pre-configured for an aerosol crimp method of attachment to a container. For joining, the edges of these two pre-formed parts are stacked. A collet mandrel is then introduced through the neck to flare out the sealant-lined wall of the innermost heater housing tube component drawing it tightly against the rolled rim of the lined shell.

Figure 6:
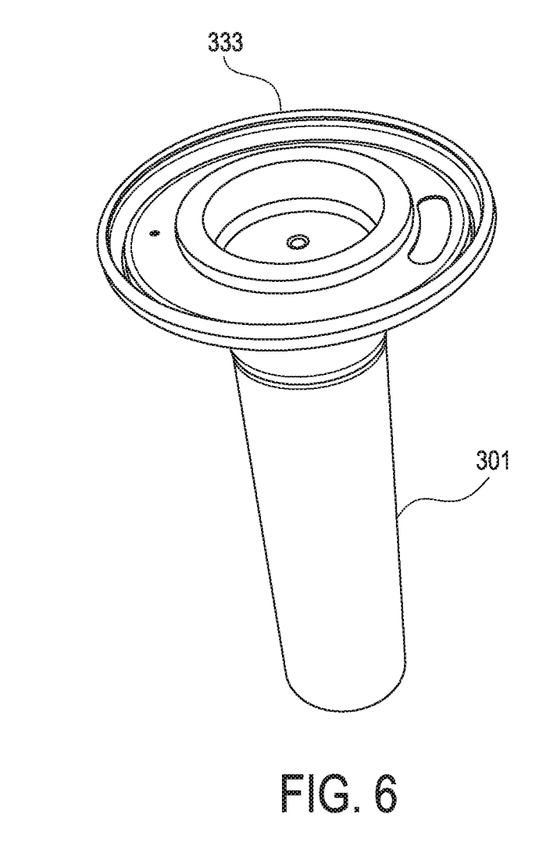
FIG. 6 is a perspective view of one embodiment of a seamable lid incorporating a heater housing tube that is suitable for seaming attachment to a conventional container body, and able to accommodate the heater and CUI components of the present invention.

FIG. 6 shows the cylindrical heater housing tube of FIG. 4 assembled onto the modified seamable end shell of FIG. 5. A conventional double roll seam container subsequently be used to seal this assembly onto the top of a filled beverage container body to provide a hermetically sealed lid prior to installation of the unibody heater module, followed by a suitable CUI.

The CUI typically takes the form of specially designed plastic lid apparatus that snaps over the edge of the can, a pour aperture 703, and may include multiple structural features molded into its upper, lower, and side walls to achieve various functions. The CUI may be injection molded from polypropylene or other food grade polymer, which beneficially provides thermal insulation between the heated metal container surface and the consumer of the heated beverage contents.

In accordance with heater mounting configuration, various alternative designs of user interface may then be applied to finish out the complete package and customize the user experience. One principal function of the CUI is to provide a means for a user to initiate the heater. For lid-mounted embodiments, in addition to initiating the heater function, the CUI typically also includes features for breaching of the sealed package closure as well as a pour aperture. Various forms of breachable seal and container opening mechanisms are described in U.S. Pat. No. 10,058,209. For these features to operate properly it is essential that when the heater housing tube is joined to the modified lined shell the proper exact angular orientation between the vertical groove 303 and the pour aperture is established.

Figure 7A:
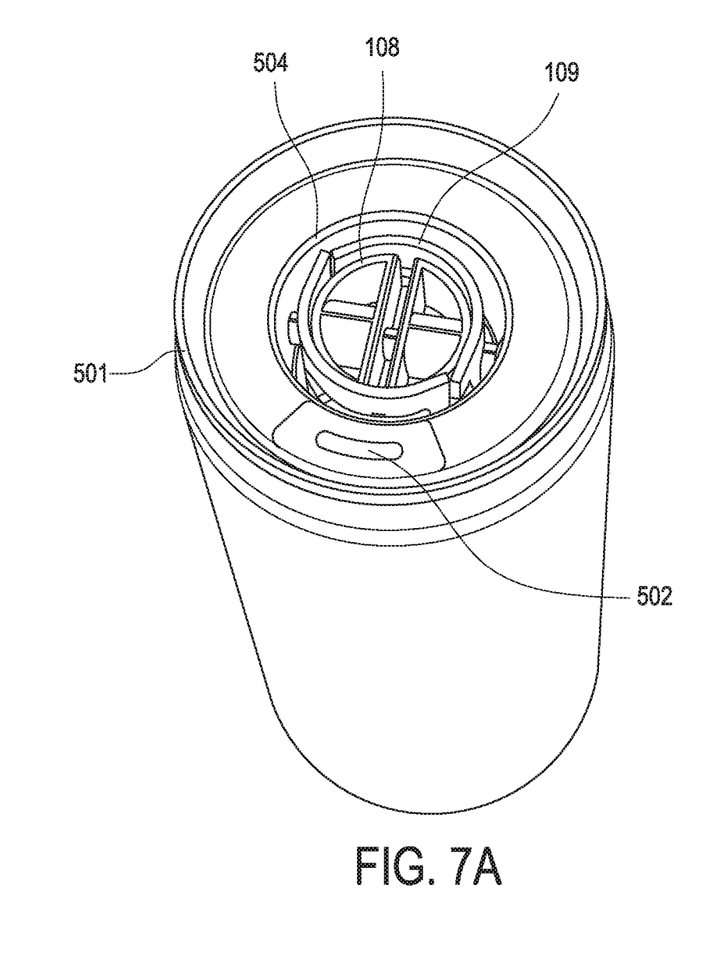
FIG. 7A is a perspective view of the seamable lid tube of FIG. 6 joined to a filled beverage container with a unibody heater module inserted.
Figure 7B:
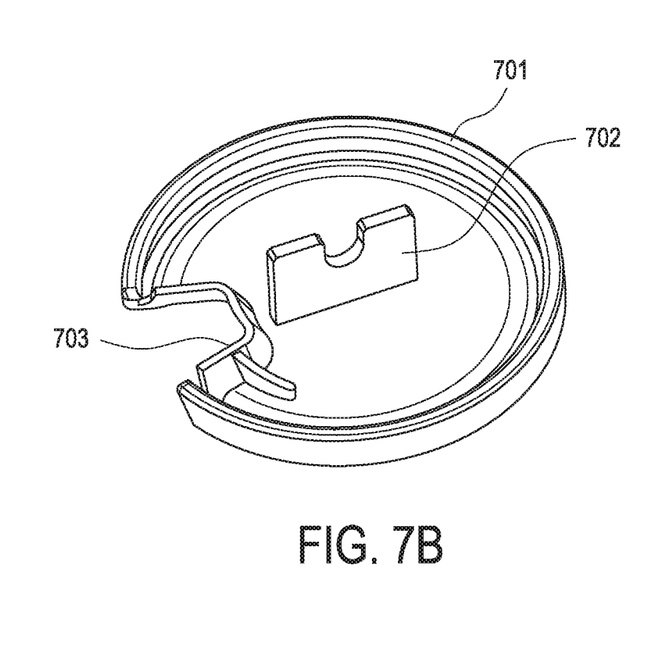
FIG. 7B is a perspective view of the underside of a CUI which, when inverted, is configured to attach to the unibody heater module shown in FIG. 7A.

FIGS. 7A and 7B show a top view of the seamable lid tube of FIG. 6 joined to a filled beverage container with a unibody heater module inserted in FIG. 7A, positioned adjacent to an inverted CUI, shown in FIG. 7B. Structural features on the lower surface of the CUI for the lid mounted heater are an undercut lip 701 for snapping onto the seamed edge bead around the top of the can, and a mechanical blade feature 702 for initiating the heater which keys into the diametric slotted feature 109 in the interior rotating cam component of the activation subassembly. This combination allows the cam to be rotated by the CUI, analogous to a screwdriver turning a slotted screw. This mechanism effectively eliminates vertical stack up concerns with dimensional tolerances or flexing of the CUI and its coupling onto the seamed edge of the can.

Figure 8:
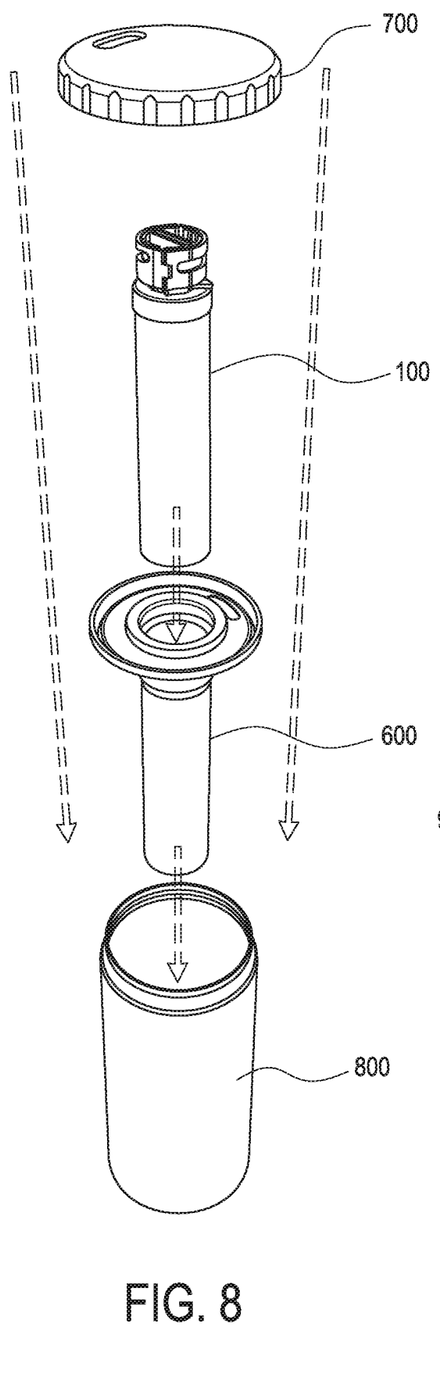
FIG. 8 is an exploded view of the major components of one embodiment of a self-heating container system of the present invention with a lid-mounted CUI.

FIG. 8 is an exploded view showing the major components of a complete self-heating container system of the present invention. The illustrated embodiment includes: a lid-mounted CUI 700, a seamable end with attached heater housing tube 600, a unibody heater module 100, and a conventional container body 800 onto which the other components may be assembled.

This embodiment of the present invention demonstrates one mode by which self-heating functionality can be incorporated into a two-piece aluminum can, the most widely used metal package format for beverage applications.

The heater tube housing and the unibody heater module can also be installed in the base of a beverage container which has certain advantages, for example permitting the use a standard pull tab closure on the container top, which may beneficially allow the heater container to be processed on convention filling and seaming operations.

Figure 9:
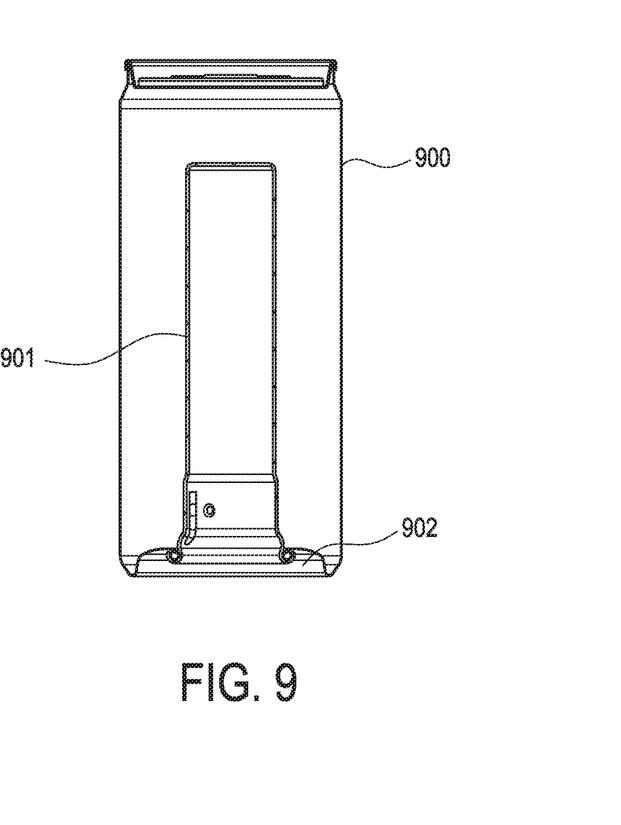
FIG. 9 is a cross-sectional view of an empty two-piece beverage container illustrating one embodiment of a base mounted heater housing tube.

FIG. 9 shows a unibody heater module 901 in the domed base 902 of a two-piece beverage container 900. A heater housing tube geometry could be directly formed into the base of a two-piece beverage container but, in practice, that is more readily accomplished for a three-piece container using a modified seamable base end.

Figure 10A:
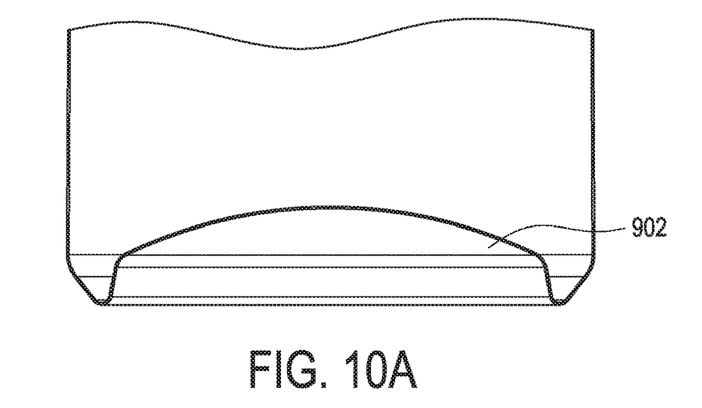
FIG. 10A through 10D are a sequence of sectional views of the base dome of a two-piece aluminum beverage container at various stages of modification for crimp joining to a heater housing tube.

As shown in FIG. 10A, the base of a two-piece beverage container always has a domed shape 902 in order to resist internal pressure which must be taken into consideration in devising means of joining a heater housing tube. With appropriate adaptations aerosol joint methods can be applied to joining a specially formed heater tube to a thin walled container base of a two-piece aluminum can. FIGS. 10A to 10D illustrate a sequence of forming stages to accomplish this objective.

Figure 10B:
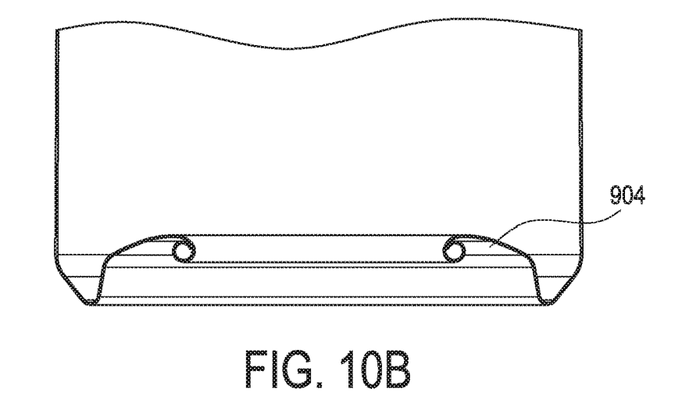

FIG. 10B shows the modified base of the aluminum container after a hole is made in the domed base with a piercing tool, followed by a wiping tool to form a straight edged collar, which is then formed into a rolled rim 904 in the container base as one side of an aerosol joint connection. A heater housing tube is preformed with a matching curled flange with a seal/gasket material applied to the underside of the curl. The edges of the two pre-formed parts are stacked and a collet mandrel is introduced through the neck to flare out the sealant-lined wall of the innermost heater housing tube component drawing it tightly against the rolled rim of the lined shell.

Successful implementation of the aerosol joint technology for joining a heater tube into a metal package requires appropriate consideration and adaptations for full performance needs such as: ensuring protective coatings are not damaged, package internal pressure, any thermal processing regimens, and the detailed geometry of the package component to which the heating tube is being joined.

Figure 10C:
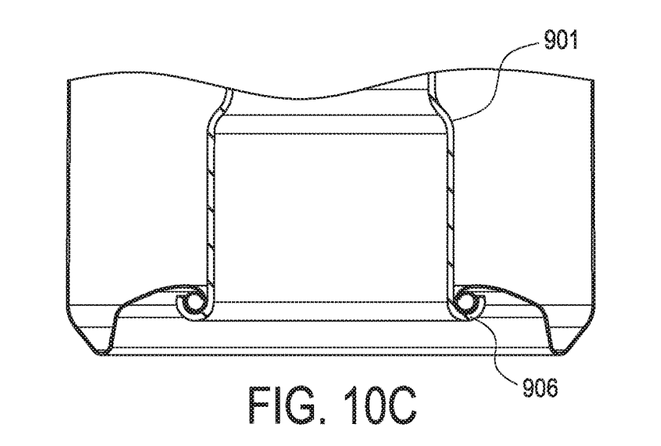
Figure 10D:
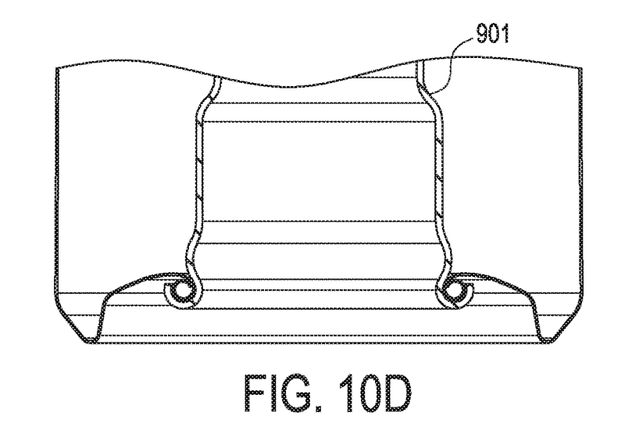

Since the beverage container wall thicknesses are thinner than the heater housing tube, the latter becomes the dominant sealing geometry around which a full 360 degree curl 906, shown in FIGS. 10C and 10D, of the internal tube mating formation is made, relying on the strength of the tube to optimize the geometric compression. A thick-walled heater tube can withstand significant die compression so a die crimping operation is a suitable alternative method to the use of the standard expanding collet.

Figure 11:
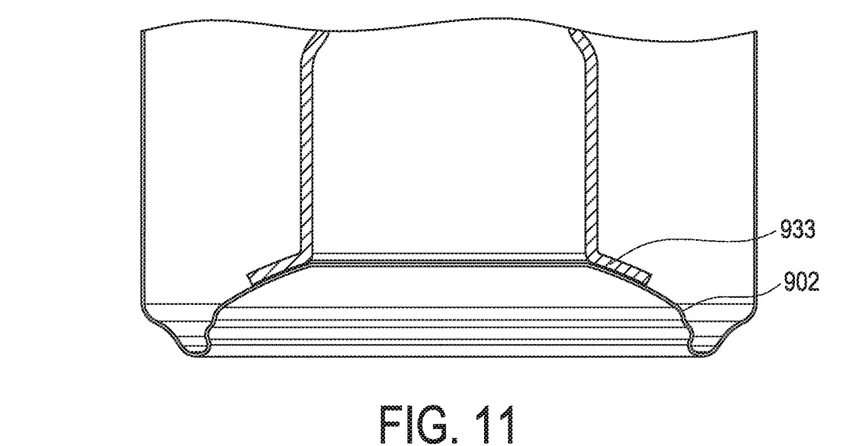
FIG. 11 is a cross-sectional view of the base dome of a two-piece beverage container showing an alternative embodiment for joining a heater housing tube to the dome using an adhesive.
Figure 12:
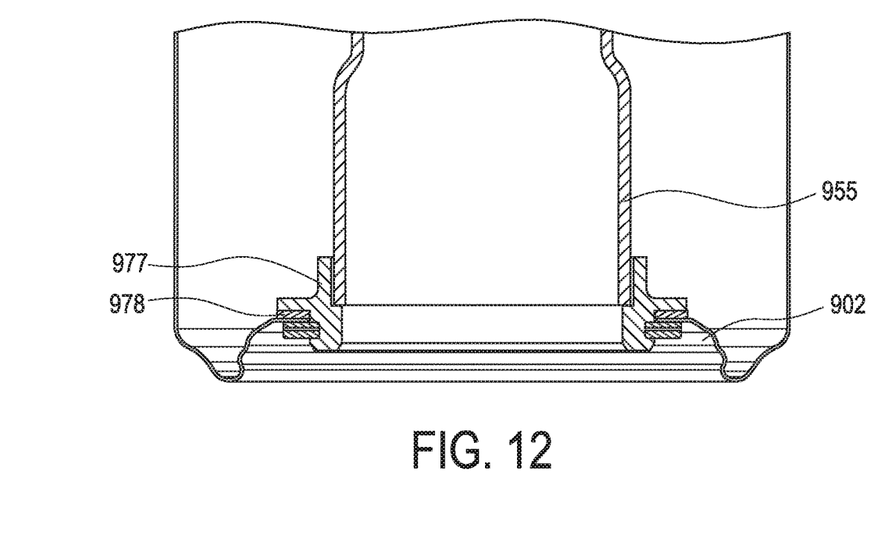
FIG. 12 is a cross-sectional view of the base dome of a two-piece beverage container showing an alternative embodiment for joining a heater housing tube to the dome using a ferrule.

FIG. 11 shows an alternative embodiment for attaching the heater housing tube to the dome of the container using a thermally stable food grade adhesive. A hole is punched in the bottom of the container using a flat punch that preserves the domed base 902 geometry and the flange 933 on the heater housing tube is formed with contours that match the dome dimensions in order to maximize the extent and strength of the bond. FIG. 12 shows a further alternative embodiment wherein a ferrule 977 and snap ring 978 are used to create a strong mechanical joint between a flangeless heater housing tube 955 and the domed base 902 of the can. An adhesive sealant is applied to seal the joints.

Figure 13:
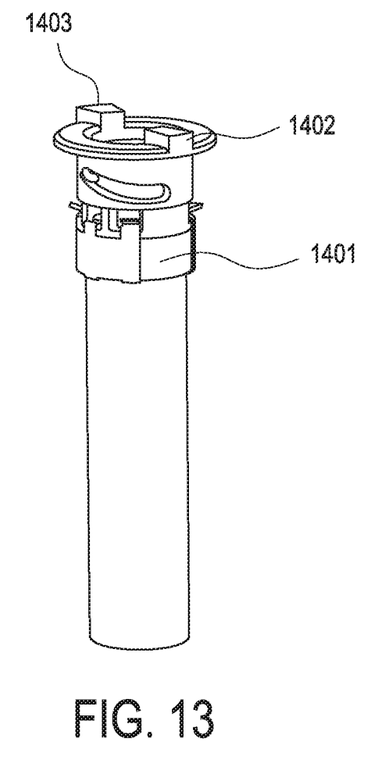
FIG. 13 is a perspective view of an alternative embodiment of a unibody heater module suitable for base-mounting in a two-piece aluminum beverage container.
Figure 14A:
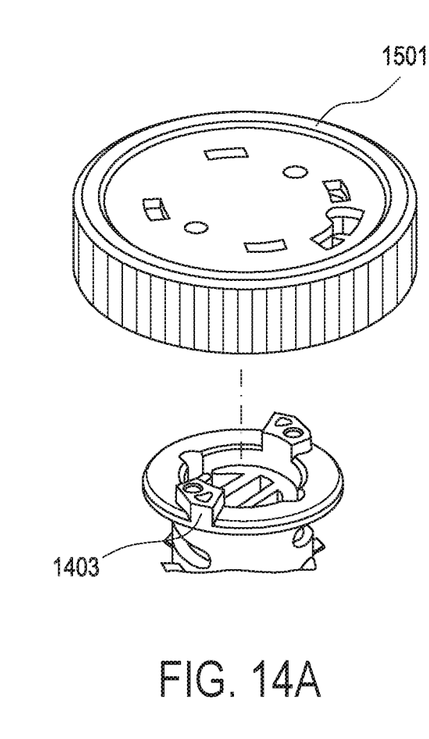
FIG. 14A through 14C are three steps in the assembly of the end coupling of the unibody heater module of FIG. 13 to the CUI with which it engages.
Figure 14B:
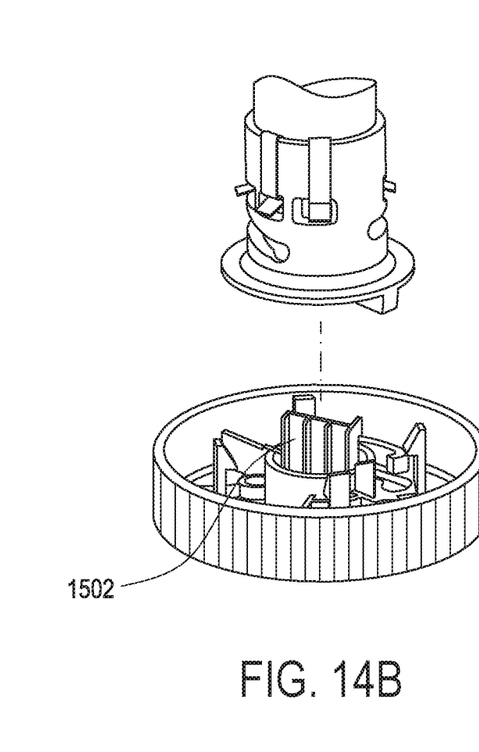
Figure 14C:
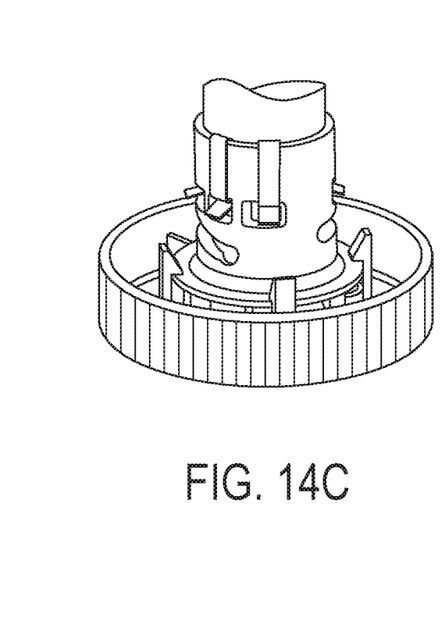

There is no seamed edge around the base of the two-piece container that a CUI can clip onto. Thus, in the alternative embodiment unibody heater module of FIGS. 13 and 14 the initiation sub-assembly incorporates an end cap flange 1402 and orientation features 1403. The orientation features fit into recesses in the base mount CUI 1501 to provide preferred alignment. The flange 1402 is grippable by flexible fingers 1502 of a base mount CUI 1501. Unidirectional surface barbs on a lock ring part 1401 formed from stamped steel allow full insertion of the unibody heater module, and then assure against its accidental or deliberate extraction.

Figure 15A:
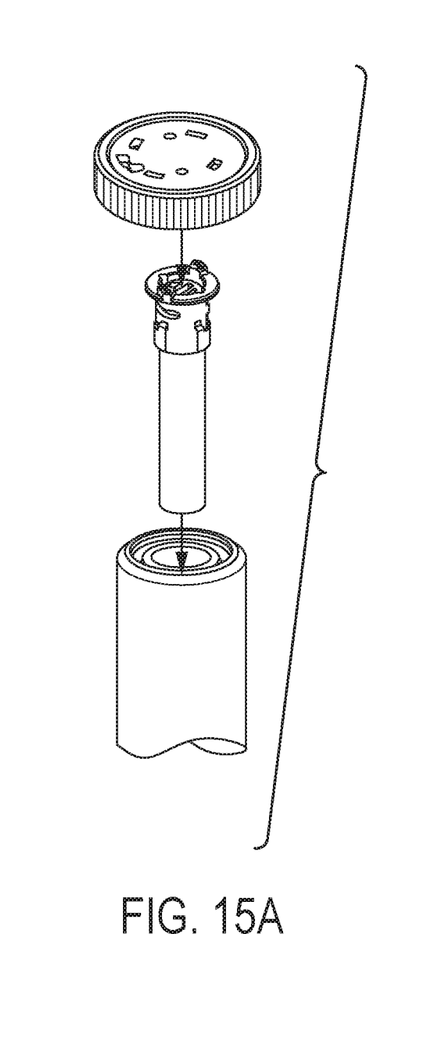
FIG. 15A is an exploded view showing the major components of one embodiment of a self-heating container system of the present invention with a base-mounted CUI.
Figure 15B:
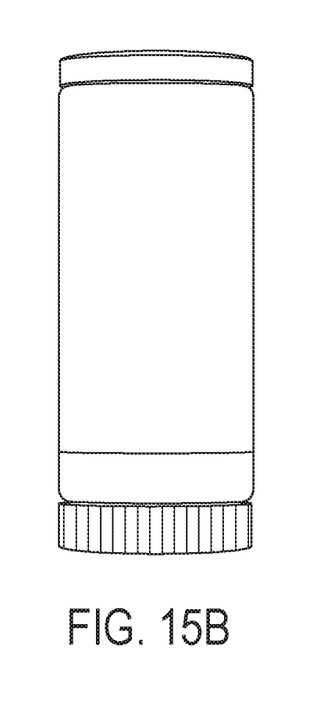
FIG. 15B is a consolidated view of the embodiment of a self-heating container system of the present invention shown in FIG. 15A.

FIG. 15 is an exploded view showing the major components of a complete self-heating container system with the heater housing tube and unibody heater module in the base of a two-piece container body.

Figure 16:
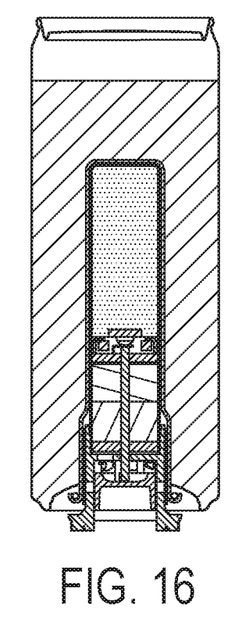
FIG. 16 is a cross-sectional view of a filled two-piece beverage container with one embodiment of the unibody heater module of the present invention inserted into a base mounted heater housing tube.
Figure 17:
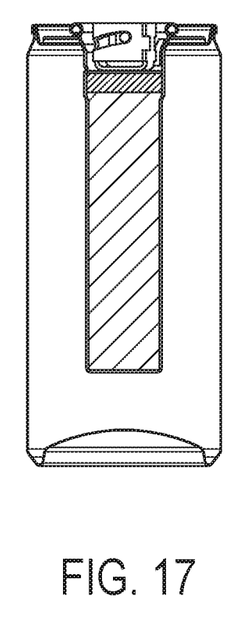
FIG. 17 is a cross-sectional view of a filled two-piece beverage container with one embodiment of the unibody heater module of the present invention inserted into a lid mounted heater housing tube.

FIG. 16 and FIG. 17 are, respectively, cross-sectional views of a filled two-piece beverage container with one embodiment of the unibody heater module of the present invention inserted into a base mounted or lid mounted heater housing tube showing how the modular components allow the self-heating functionality to be alternatively integrated into either the lid or the base of a self-heating beverage container package, to which a suitable consumer user interface can then be applied.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of closure systems known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

To aid the Patent Office and any readers of any patent issued on this application in interpreting the claims appended hereto, the applicant wishes to note that it does not intend any of the appended claims or claim elements to invoke 35 U.S.C. 112(f) unless the words "means for" or "step for" are explicitly used in the particular claim.

What is claimed is:

1. A heater assembly, comprising:
a heater housing tube;
a heater canister configured to be positioned within the heater housing tube, the heater canister having a based filled with a solid-state reaction mixture and a rotatable end cap with an initiation subassembly positioned therein, the initiation subassembly having an outer sleeve configured with a helically sloping grooved channel which engages a guide pin fixed to a rotatable cam positioned inside the heater housing tube;
a reactive starting pellet embedded into an upper surface of the solid-state reaction mix;
a compression blister containing a starting fluid positioned adjacent to the reactive starting pellet;
a firing pin having one end affixed to the initiation subassembly and another end configured with a plunger head which is positioned, in a pre-actuation rest position, proximal to the compression blister;
wherein, when the initiation subassembly is rotated, the firing pin is displaced toward the compression blister until contacting and rupturing the compression blister, whereupon the starting fluid reacts with the reactive starting pellet to ignite the solid-state reaction mixture.

2. The heater assembly of claim 1, wherein the solid-state reaction mixture comprises 15-25% aluminum with particle size of 2-30 microns, 20-30% silicon dioxide and 25-45% alumina.

3. The heater assembly of claim 1, wherein a projecting barb feature of the heater housing tube is set in a specific angular relation to an initial rest position of a rotatable cam, thereby providing a specific preferred alignment of the heater housing tube in the heater assembly.

4. The heater assembly of claim 1, wherein a slotted feature on the initiation subassembly mates with a blade feature on a user-activated consumer user interface, whereupon when the consumer user interface is rotated the initiation subassembly is rotated.

5. The heater assembly of claim 4, wherein the consumer user interface is a plastic lid that snaps over an edge of a container.

6. The heater assembly of claim 1, wherein a passive thermal control material is positioned adjacent to, or in thermal contact with, the base of the heater canister.

7. The heater assembly of claim 1, wherein the end cap is configured with vents to allow release of excess pressure from the reaction chamber.

8. The heater assembly of claim 1, wherein the end cap is configured with a projecting barb feature and the heater housing tube is configured with a vertical groove, wherein the projecting barb feature aligns in the vertical groove to establish a desired orientation of the heater canister in the heater housing tube during assembly.

9. The heater assembly of claim 1, wherein the heater housing tube is configured with an end flange that allows the heater assembly to be affixed to a container.

10. The heater assembly of claim 9, wherein the end flange is attached to the container using an aerosol crimp.

11. The heater assembly of claim 9, wherein the end flange is attached to the container using adhesive.

12. The heater assembly of claim 9, wherein the end flange is attached to the container using a ferrule.

13. The heater assembly of claim 9, wherein the end flange is attached to the top of the container.

14. The heater assembly of claim 9, wherein the end flange is attached to the bottom of the container.

15. The heater assembly of claim 1, wherein the heater housing tube is configured with a pour aperture.

16. The heater assembly of claim 1, wherein compressive forces applied to the ends of the heater assembly do not activate the solid-state reaction mixture.

17. A container, comprising:
a container having a heater canister positioned in a heater housing tube, the heater canister having a base filled with a solid-state reaction mixture and a rotatable end cap with an initiation subassembly positioned having an outer sleeve therein, the outer sleeve configured with a helically sloping grooved channel which engages a guide pin fixed to a rotatable cam positioned therein;
a reactive starting pellet embedded into an upper surface of the solid-state reaction mix;
a compression blister containing a starting fluid positioned adjacent to the reactive starting pellet;
a firing pin having one end affixed to the initiation subassembly and another end configured with a plunger head which is positioned, in a pre-actuation rest position, proximal to the compression blister;
wherein, when the initiation subassembly is rotated, the firing pin is displaced toward the compression blister until contacting and rupturing the compression blister, whereupon the starting fluid reacts with the reactive starting pellet to ignite the solid-state reaction mixture.

18. The container of claim 17, wherein the solid-state reaction mixture comprises 15-25% aluminum with particle size of 2-30 microns, 20-30% silicon dioxide and 25-45% alumina.

19. The container of claim 17, wherein a projecting barb feature of the heater housing tube is set in a specific angular relation to an initial rest position of a rotatable cam, thereby providing a specific preferred alignment of the heater housing tube in the heater assembly.

20. The container of claim 17, wherein a slotted feature on the initiation subassembly mates with a blade feature on a user-activated consumer user interface, whereupon when the consumer user interface is rotated the initiation subassembly is rotated.

21. The container of claim 17, wherein the consumer user interface is a plastic lid that snaps over an edge of a container.

22. The container of claim 17, wherein a passive thermal control material is positioned adjacent to, or in thermal contact with, the base of the heater canister.

23. The container of claim 17, wherein the end cap is configured with vents to allow release of excess pressure from the reaction chamber.

24. The container of claim 17, wherein the end cap is configured with a projecting barb feature and the heater housing tube is configured with a vertical groove, wherein the projecting barb feature aligns in the vertical groove to establish a desired orientation of the heater canister in the heater housing tube during assembly.

25. The container of claim 17, wherein the heater housing tube is configured with an end flange that allows the heater assembly to be affixed to a container.

* * * * *